United States Patent Office 3,156,735
Patented Nov. 10, 1964

3,156,735
OXIDATIVE DEHYDROGENATION USING GOLD-PLATINUM GROUP METAL CATALYST
Warren E. Armstrong, Lafayette, Calif., assignor to Shell Oil Company, New York, N.Y., a corporation of Delaware
No Drawing. Filed Dec. 12, 1960, Ser. No. 75,085
10 Claims. (Cl. 260—680)

The present invention relates to novel catalysts for the oxidative dehydrogenation of hydrocarbons and related organic materials and to the oxidative dehydrogenation of such materials.

Considerable investigations of suitable catalytic materials exhibiting properties and characteristics conducive to the promotion of varied chemical reactions are currently in progress throughout the petroleum and petrochemicals industries. Several catalytic materials have ben developed in the past, each of which exhibits certain peculiarities and advantages in connection with specific catalytic reactions. Occasionally the catalyst is discovered which has varied applications and such catalyst is of considerable importance in the furtherance of petroleum and petrochemical technology.

In this connection great interest is exhibited in the area of dehydrogenation of, for example, olefins, and recently the advent of oxidative dehydrogenation catalysis has even further projected the catalytic art. Oxidative dehydrogentation, as the term is used, is intended to connote a catalytic dehydrogenation reaction wherein there is present also an oxidant such as, for example, oxygen or air. In such reaction the oxidant combines with the hydrogen which is split off from the saturated molecule, whereby water is formed, thus allowing reaction to proceed in the desired direction. Thus, it will be readily appreciated that catalytic oxidative dehydrogenation processes are of steadily increasing importance along with the catalytic materials specially prepared for use therein.

The present invention provides improved catalytic conversions and as a new catalyst therefor an alloy of gold and platinum, palladium, ruthenium, rhodium or iridium preferably on a particular supporting material, for example, certain relatively inert substances having the characteristics exhibited by low surface area materials.

The following reactions are illustrative of those contemplated within the scope of the present invention. n-butenes to butadiene; isoamylenes to isoprene; isopropyl alcohol to acetone; methanol to formaldehyde; benzene to maleic anhydride; naphthalene to phthalic anhydride; allyl alcohol to acrolein; acrylamide to acrylonitrile; and cyclohexane to benzene. Moreover, in the presence of ammonia, acrylonitrile may be made from propylene, and methacrolein from isobutene.

The reactions of primary consideration herein are the formation of butadiene from normal butenes and of isoprene from isoamylenes. In view of the fact that the catalytic material of the present invention exhibits adaptability as a promoter for such reactions interchangeably, its usefulness in petroleum processing is of paramount consideration.

In accordance with the present invention suitable low surface support material such as, for example, fused alumina, e.g. Alundum or fused silica, is impregnated with a solution to be described hereinafter. The Alundum support which is particularly desirable is that containing substantially alpha-alumina; it being understood that an increase in gamma-alumina content correspondingly increases the surface area. In this connection Alundum having a surface are not in excess of 1 square meter per gram is particularly desirable. With regard to fused silica, the surface area thereof should also be maintained at a low value, for example less than 3 square meters per gram. It has been found that supporting media of an inert nature and having low surface area represent the preferred materials to be used herein. Table I shows the effect in an oxidative dehydrogentation of suface area of the support on the performance of a catalyst containing 0.3% by weight of a gold-platinum composite in an atomic ratio of 5 Au·1 Pt. It has been found that the surface area is critical in the catalyst composition, in that with high surface area materials the oxygen fed to the reaction converts the hydrocarbon charge to carbon dioxide. Catalyst selectivity is considerably impaired where the surface area is from 6 to 8 square meters per gram.

TABLE I

*Effect of Surface Area of Support*

Conditions:
    9 mm. I.D. glass reactor tube
    4 cc. catalyst
    $C_4H_8/O_2=1$; $argon/O_2=4$
    Total flow rate=120 cc./min.
    Temperature variable
    Composition 0.3% 5 Au·Pt on Alundum

| Catalyst Description | | Performance | | | |
|---|---|---|---|---|---|
| M.²/g. of Support | Calcination Temp., °C. | Temp., °C. | Conversion, percent | | Selectivity, percent m. | |
| | | | $O_2$ | $C_4H_8$ | $C_4H_6$ | $CO_2+CO$ |
| <1 | 500 | 460 | 40 | 36 | 80 | 14 |
| <1 | 500 | 460 | 83 | 38 | 65 | 32 |
| ∧100 | 500 | 413 | 96 | 22 | 12 | 83 |
| 60–70 | 500 | 360 | 92 | 19 | 9 | 87 |
| 20–30 | 500 | 357 | 97 | 19 | 18 | 82 |
| 6–8 | 500 | 470 | 98 | 27 | 41 | 56 |

With regard to the composition of a gold-platinum catalytic material, it has been found that the optimum ratio for the best selectivity, particularly in the case of the oxidative dehydrogenation of butylene to butadiene, is about five parts (atoms) of gold to one part of platinum. The composition range giving a selectivity of 60% or more is quite broad, being roughly 1 part gold and 5 parts platinum to 25 parts of gold and 1 part of platinum, with about 0.3% of noble metal on the supporting media. Moreover the invention contemplates a variation of the ratio of the chloroplatinic to the chloroauric acid over certain preferred ranges, as will be apparent from a consideration of Table II.

TABLE II

*Effect of Different Compositions on Alundum*

Conditions:
    9 mm. I.D. glass reactor tube
    4 cc. catalyst
    $C_4H_8=1$; $argon/O_2=4$
    Total flow rate=120 cc./min.

| Catalyst Description | | Performance | | | |
|---|---|---|---|---|---|
| Composition on Alundum | Calc. Temp., °C. | Temp., °C. | Conversion, percent | | Selectivity, percent, m. | |
| | | | $O_2$ | $C_4H_8$ | $C_4H_6$ | $CO_2+CO$ |
| 0.3% Au·5 Pt | 500 | 460 | 55 | 32 | 69 | 28 |
| 0.3% 5 Au·Pt | 500 | 460 | 40 | 36 | 80 | 14 |
| 1% Au·2 Pt | 500 | 462 | 91 | 48 | 52 | 48 |
| 0.1% 5 Au·Pt | 500 | 464 | 87 | 35 | 40 | 59 |
| 0.03% 5 Au·Pt | 500 | 494 | 35 | 25 | 60 | 37 |
| 3.4% Au·2 Pt | 500 | 456 | 95 | 45 | 49 | 50 |
| 3% 5 Au·Pt | 500 | 460 | 95 | 45 | 67 | 33 |
| 0.3% 10 Au·Pt | 500 | 460 | 74 | 35 | 61 | 36 |
| 0.3% 25 Au·Pt | 500 | 460 | 85 | 26 | 42 | 55 |

Moreover, it has been found that the 5 Au·Pt catalyst is more selective after calcining at 800° C. than 500° C.

Referring to Table III, there is shown the effect of calcination temperature in the case of the oxidative dehydrogenation of butylene. It will be appreciated that improvement of the selectivity of the catalysts containing both 0.3% and 1.0% of 5 Au·Pt on Alundum supporting media results from calcining at 800° C.

TABLE III

Effect of Calcination Temperature

Conditions:
  9 mm. I.D. glass reactor tube
  4 cc. catalyst
  $C_4H_8/O_2=1$; argon/$O_2=4$
  Total flow rate = 120 cc./min.
  Temperature variable

| Catalyst Description | | | Performance | | | |
| --- | --- | --- | --- | --- | --- | --- |
| Composition on Alundum | Calc. Temp., °C. | Temp., °C. | Conversion, percent | | Selectivity, percent, m. | |
| | | | $O_2$ | $C_4H_8$ | $C_4H_6$ | $CO_2+CO$ |
| 0.3% 5 Au·Pt | 500 | 460 | 40 | 36 | 80 | 14 |
| 0.3% 5 Au·Pt | 500 | 460 | 83 | 38 | 65 | 32 |
| 0.3% 5 Au·Pt | 800 | 480 | 21 | 37 | 86 | 14 |
| 1% 5 Au·Pt | 500 | 510 | 90 | 50 | 68 | 30 |
| 1% 5 Au·Pt | 800 | 510 | 26 | 43 | 91 | 5 |

As a specific example of one method for impregnating supporting media with the platinum-gold material imparting catalytic activity thereto, a solution of chloroplatinic acid and chloroauric acid, containing in the nature of about 0.5% w. of each metal, is added thereto. Such addition of the metals in solution to the support media should be sufficient to provide in the nature of about from 0.05% w. to 5% w. total solids, with 0.3% w. total solids being particularly useful.

The catalytic material now deposited on the supporting media is suitably removed from solution, dried at 120° C. and calcined at a temperature within the range of about 500–800° C. The exact composition of the finalized catalyst is not entirely known but it is believed to be an oxidized form of platinum and gold when used as an oxidative dehydrogenation catalyst.

While the foregoing is illustrative of one preferred method for preparing the catalytic platinum-gold material, other means for preparation thereof will be apparent from a consideration of the following alternate procedures. For example, colloidal suspensions of gold and platinum in lavendar oil and resin, commonly known as "bright liquids" and used in the decorative ceramic arts, are deposited as a thin film on supporting media, such as Alundum, and then fired at 600–700° C. The catalytic material is then calcined at 650° C. Results obtained through the use thereof are shown in Table IV, which illustrates the effect of preparation variables on catalyst performance.

Moreover while the catalytic composition comprising platinum-gold on supporting media represents the preferred embodiment of the invention, it has nevertheless been found that palladium may be used in lieu of platinum under certain circumstances and ruthenium is also appropriate. Table V shows variations in the composition of the catalytic material and the results obtained therefrom.

TABLE V

Different Compositions of Noble Metals on Alundum

Conditions:
  9 mm. I.D. glass reactor tube
  4 cc. catalyst
  $C_4H_8/O_2=1$; argon/$O_2=4$
  Total flow rate = 120 cc./min.

| Catalyst Description | | | Performance | | | |
| --- | --- | --- | --- | --- | --- | --- |
| Composition on Alundum Atomic Ratios | Calcination Temp., °C. | Temp., °C. | Conversion, Percent | | Selectivity Percent m. | |
| | | | $O_2$ | $C_4H_8$ | $C_4H_6$ | $CO+CO_2$ |
| 0.3% 5 Au·Pd | 500 | 491 | 63 | 40 | 76 | 23 |
| 0.3% 5 Au·Ru | 500 | 396 | 41 | 21 | 34 | 33 |
| 0.3% 5 Au·Pt·Ru | 500 | 380 | 100 | 27 | 32 | 64 |
| 0.3% 5 Au·Pt·1/10 Ru | 500 | 460 | 28 | 30 | 87 | 11 |
| 0.45% 5 Au·8 Pd | 500 | 343 | 87 | 30 | 51 | 49 |
| 0.75% Au·4 Pd | 500 | 320 | 99 | 29 | 34 | 59 |

While the foregoing description and tabular data are illustrative of reactions involving the conversion of butylenes to butadiene, similar results are obtainable in connection with, for example, $C_5$ hydrocarbon streams or those other reactions set forth hereinbefore.

Moreover, it will be readily appreciated that the catalytic material of the present invention exhibits critical characteristics in both its composition, as well as in the means for its preparation. For example, the ratio of gold to other noble metal, preferably platinum, can vary under the wide ranges disclosed hereinbefore. Also the amount of noble metal deposited on the inert support media may vary within the range from about 0.05% to 5%, with an optimum amount of about 0.3%. Furthermore temperatures of calcination may vary from 350° C. to 800° C., as already set forth, with calcination of around 800° C. providing a preferred material with regard to selectivity, whereas conversion approaches a maximum value when the catalytic material is calcined at about 500° C. Certain variations in the surface area are permissible, not to exceed 8 sq. meters per gram in the case of Alundum or about 2 sq. meters per gram in the case of fused alumina; the catalytic activity depending to a large measure on the surface area of the supporting media. While alumina represents a preferred inert supporting medium, other refractory inert supports in conventional use and exhibiting

TABLE IV

Effect of Preparation Variables

Conditions:
  9 mm. I.D. glass reactor tube
  4 cc. catalyst
  $C_4H_8/O_2=1$; argon/$O_2=4$
  Total flow rate = 120 cc./min.
  Temperature variable

| Catalyst Description | | Catalyst Performance | | | | | |
| --- | --- | --- | --- | --- | --- | --- | --- |
| Composition on Alundum | Remarks | Calcination Temp., °C. | Temp., °C. | Conversion, Percent | | Selectivity, Percent m. | |
| | | | | $O_2$ | $C_4H_8$ | $C_4H_6$ | $CO_2+CO$ |
| 0.5% 3.5 Au·Pt | From "bright liquid" Au+Pt. | 650 | 500 | 100 | 46 | 32 | 66 |
| 0.3% 5 Au·Pt+0.5% Na | $HAuCl_6+H_2PtCl_6+NaOH$ | 500 | 490 | 100 | 43 | 28 | 72 |
| 0.3% 5 Au·Pt | Reduced in $H_2$ | 500 | 480 | 91 | 29 | 45 | 54 | relatively low surface area may also advantageously be employed.

While the foregoing description and examples represent preferred embodiments and features of advantage in the present invention, they are not intended as a limitation thereof of the exact details set forth therein except as delineated by the following claims.

I claim as my invention:

1. The process for oxidatively converting olefinically unsaturated hydrocarbons to corresponding more unsaturated hydrocarbons having a higher carbon to hydrogen ratio which consists essentially of contacting said olefinically unsaturated hydrocarbons, in admixture with oxygen, at an elevated temperature, with a catalytically active composition consisting essentially of gold in combination with a noble metal selected from the group consisting of platinum, palladium, rhodium, ruthenium and iridium, and a solid refractory oxide supporting material having a surface area less than 8 $m^2/g.$, said catalytically active composition containing said gold and said noble metal in a ratio of from about 0.2 to about 25 atoms of gold per atom of said noble metal.

2. Process in accordance with claim 1 wherein the noble metal content of the catalytically active material is from 0.05 to 5 percent by weight.

3. Process in accordance with claim 1 wherein said organic material to be dehydrogenated is butylene and said corresponding dehydrogenated product is butadiene.

4. Process in accordance with claim 1, wherein the organic material to be dehydrogenated is isoamylene and the corresponding dehydrogenated product is isoprene.

5. The process for the oxidative dehydrogenation of olefinic hydrocarbons to corresponding more unsaturated hydrocarbons which consists essentially of contacting said olefinic hydrocarbons in admixture with oxygen, at a temperature of from about 400 to about 550° C. with a catalyst composition consisting essentially of gold in combination with platinum and a solid low surface area catalyst support having a surface area of less than 8 $m^2/g.$, said catalyst composition containing from about 0.2 to 25 atoms of gold per atom of platinum, and a total amount of from about 0.05% to about 5% of said metals.

6. The process in accordance with claim 5 wherein said low surface area support consists essentially of alpha-alumina having a surface area of less than about 1 $m^2/g.$ 7. The process in accordance with claim 5 wherein said low area surface support consists essentially of fused silica having a surface area of less than about 3 $m^2/g.$ 8. The process in accordance with claim 5 wherein said catalyst composition has been calcined at about 500 to about 800° C. before use.

9. The process for the oxidative dehydrogenation of n-butylenes to butadiene which consists essentially of contacting n-butylene in admixture with oxygen, at a temperature of from about 400 to about 550° C., with a catalyst composition consisting essentially of gold in combination with platinum and alpha-alumina having a surface area below about 1 $m^2/g.$, said catalyst composition containing from about 0.2 to about 25 atoms of gold per atom of platinum and a total amount of from about 0.05 to about 5% of said metals.

10. The process for the oxidative dehydrogenation of isoamylenes to isoprene which consists essentially of contacting isoamylene in admixture with oxygen, at a temperature of from about 400 to about 550° C., with a catalyst composition consisting essentially of gold in combination with platinum and alpha-alumina having a surface area below about 1 $m^2/g.$, said catalyst composition containing from about 0.2 to about 25 atoms of gold per atom of platinum, and a total amount of from about 0.05 to about 5% of said metals.

References Cited in the file of this patent

UNITED STATES PATENTS

| | | |
|---|---|---|
| 2,206,773 | Hale | July 2, 1940 |
| 2,437,706 | Paterson | Mar. 16, 1948 |
| 2,562,583 | Schulz et al. | July 31, 1951 |
| 2,802,889 | Frevel et al. | Aug. 13, 1957 |
| 2,849,408 | Bente | Aug. 26, 1958 |
| 2,884,460 | Komarewsky | Apr. 28, 1959 |
| 2,885,442 | McCulloch et al. | May 5, 1959 |
| 2,892,801 | Sargent | June 30, 1959 |
| 2,910,502 | Hoaglin et al. | Oct. 27, 1959 |
| 2,939,883 | Punderson | June 7, 1960 |
| 2,976,337 | Christmann | Mar. 21, 1961 |
| 2,991,320 | Hearne et al. | July 4, 1961 |